Dec. 25, 1962 A. RAZIS 3,070,322

COMPOSITE MAGNETIC RECORDER DEVICE

Filed Nov. 3, 1959 5 Sheets-Sheet 1

Dec. 25, 1962 A. RAZIS 3,070,322

COMPOSITE MAGNETIC RECORDER DEVICE

Filed Nov. 3, 1959 5 Sheets-Sheet 2

Dec. 25, 1962 A. RAZIS 3,070,322

COMPOSITE MAGNETIC RECORDER DEVICE

Filed Nov. 3, 1959 5 Sheets-Sheet 4

United States Patent Office 3,070,322
Patented Dec. 25, 1962

3,070,322

COMPOSITE MAGNETIC RECORDER DEVICE

André Razis, Paris, France, assignor to Societe d'Etudes et de Brevets S.A., Tangier, Morocco, a company of Tangier Filed Nov. 3, 1959, Ser. No. 850,603
Claims priority, application France Feb. 12, 1959
4 Claims. (Cl. 242—55.13)

The handling of recording medium in the form of tape and especially of wire in magnetic recorders is always difficult. A number of existing magazine systems for tape wound on reels one turn to a layer have produced an improvement in these instruments. In the case of wire wound in reels a plurality of turns to a layer however, the problem is more difficult to resolve because the magnetic head must necessarily be displaced a distance equal to that of the length of a layer of turns as and when the wire unwinds during the operation of the recorder. The magazines designed up to the present time have not given satisfactory results for wire. However, for magnetic recorders of very small size and having a long unwinding duration, wire is the only recording medium which is suitable, on the condition that it is possible to eliminate the drawback of direct manipulation of the wire reels.

The present invention has therefore for its object a universal magazine for tape or wire adaptable for use in magnetic recorders employing either recording medium.

The essential characteristic of this magazine consists in that it enables, by the operation of a single knob, to obtain either the freeing of the magazine accompanied by the locking of the longitudinal travel of the recording medium accompanied by the release of the longitudinal movement of the recording medium and the placing of the recording medium in contact with the magnetic head.

Other characteristic features of the magazine, especially in the particular case in which the recording medium is a wire, will be brought out in the description which follows relative to a form of embodiment chosen by way of example and shown in the accompanying drawings, in which.

A casing formed of two interfitting members 1 and 2 contains two reels 6 for the magnetic tape or wire, together with the locking and release members for the tape or the wire and the reels, depending on whether the magazine is placed in position on the magnetic recorder or is separated from the recorder. All the controls are effected by a single knob B rigidly fixed to two oval cams 3 and 9.

Figure 1:
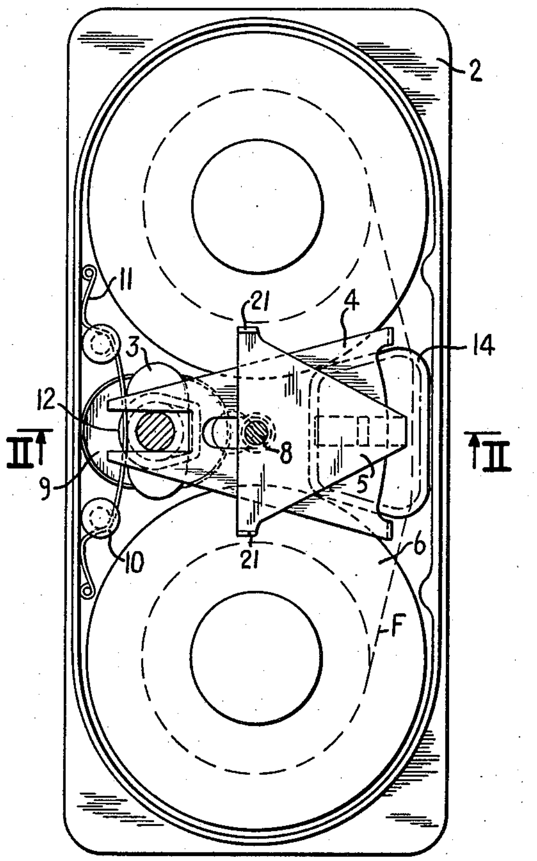
FIG. 1 is a cross-section in plan of the magazine, the parts being arranged in the operating position.

In the working position, the cam 3 is placed as shown in FIG. 1. It is in contact with the central portion of a spring 11, the position of which is in turn ensured by two guides 10.

Figure 7:
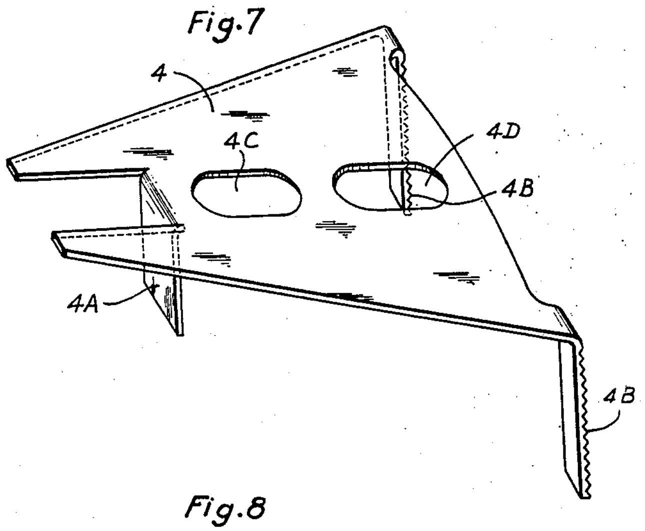
FIG. 7 is a perspective view of a detail of the release member.
Figure 8:
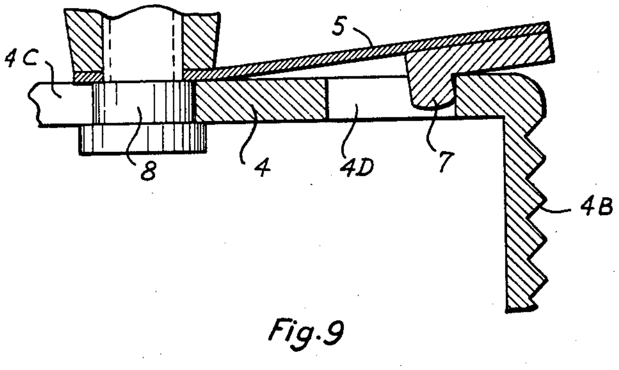
FIGS. 8 and 9 show respectively, on a larger scale, details of a part of FIGS. 2 and 4.
Figure 9:
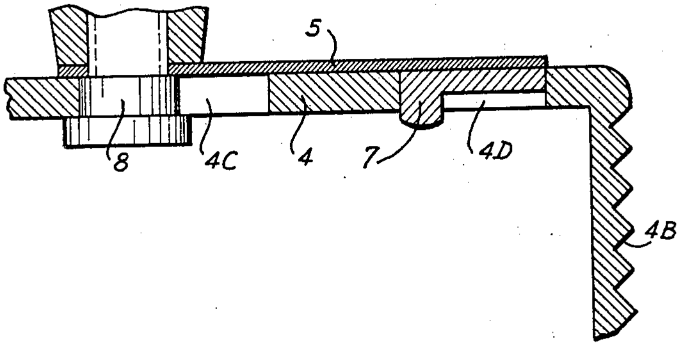

A member 4 known as the release member and shown in perspective in FIG. 7, is guided by a fork-shaped member defined in one end of release member 4 that fits in a groove formed in the upper part of the cam 3. Between the two arms of the fork is located a lug 4A bent at 90° to the plane of the part 4. This lug is in contact with the cam 3. The part 4 is provided at its other end with two downwardly-projecting strips 4B formed with saw-teeth. The part 4 is also formed with an elongated slot 4C guided by a shouldered screw 8. A tension spring 12 of small diameter is housed in a groove of the cam 3 and also encloses the lug 4A of the part 4. This spring thus ensures the contact between the cam 3 and the release member 4. The shouldered screw 8 also clamps one end of a flat spring 5 (see also FIGS. 8 and 9), the position of which is ensured by two small cambered portions 21 which are housed in blind holes (not shown) in the casing.

The flat spring 5 is provided with a small lug 7 which cooperates with a further elongated slot 4D in the release member 4.

Figure 2:
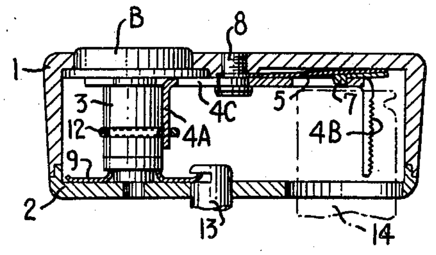
FIG. 2 is a cross-section in elevation taken along the line II—II of FIG. 1.
Figure 4:
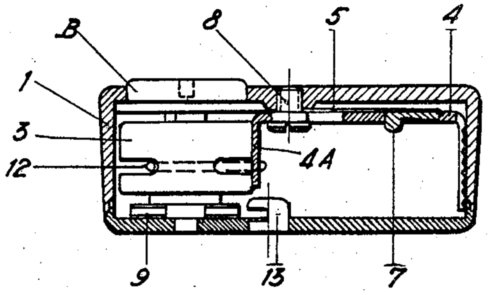
FIG. 4 is a cross-section in elevation taken along the line IV—IV of FIG. 3.
Figure 5:
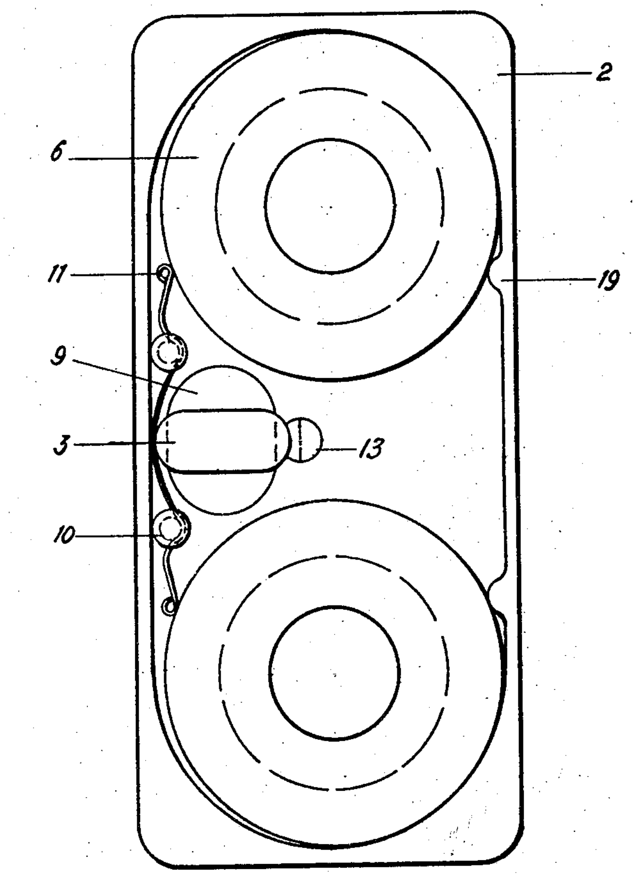
FIG. 5 is a view similar to that of FIG. 3, intended to show the locking of the reels; certain parts have been removed in order to make the drawing clearer.

The cam 9, formed by a flat oval spring (FIGS. 1 and 2) can pass into a centering member 13 (FIGS. 2, 4 and 5) which forms a part of the magnetic recorder or like apparatus.

Figure 3:
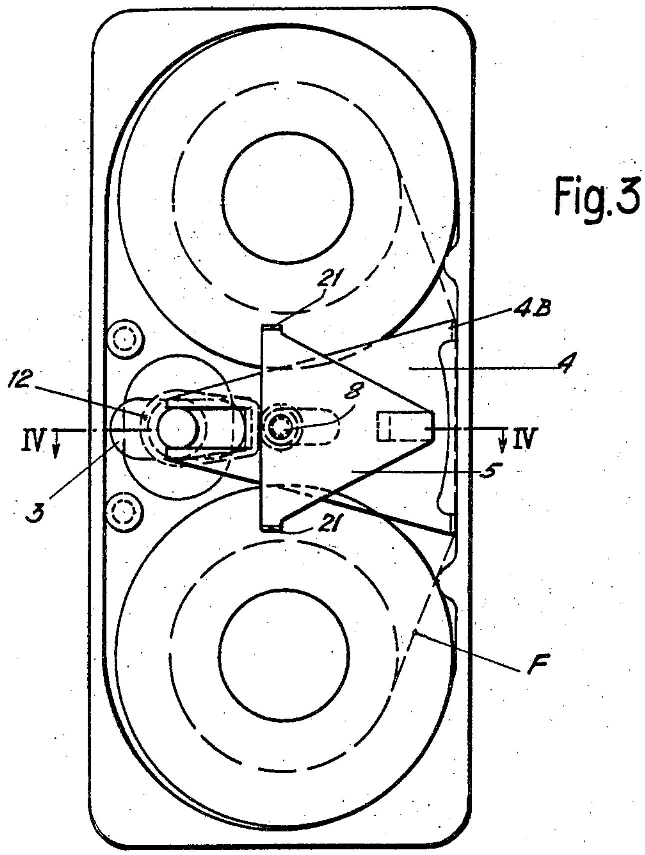
FIG. 3 is a cross-section in plan similar to that of FIG. 1, but in which the parts are in the locked position, the locking spring of the reels being removed.

The magazine being in position on the recorder and in the working position (FIGS. 1 and 2), the knob B is turned through 90° in one direction or the other. In these conditions (FIG. 5), the spring 11 is deformed and its two extremities lock the two reels 6 against the walls of the casing and against the bosses 19. At the same time, the other part of the cam 3, acting on the lug 4A, pushes the member 4 towards the right until it takes up the position of FIGS. 3 and 4, the saw-tooth strip members 4B coming closer to the wall of the casing, taking with them the wire F of the recording medium band and forcing it against that wall. Finally, the cam 9 which was engaged in FIG. 1 in the centering member 13 on the recorder, is disengaged therefrom. The magazine can now be removed from the recorder. At the end of the movement towards the right of the member 4 (FIG. 9), the lug 7 passes into the slot 4D and the member 4 is thereafter locked in the position of FIGS. 4 and 9, and the recording medium F is also locked, even if the knob B is subsequently operated. This locking is essential in the case in which a recording medium in the form of wire is employed, since the magazine can be placed on different apparatus, and the position of the magnetic head may not be the same as at the moment when the magazine is withdrawn.

The operations for placing the magazine in position will now be described.

Figure 6:
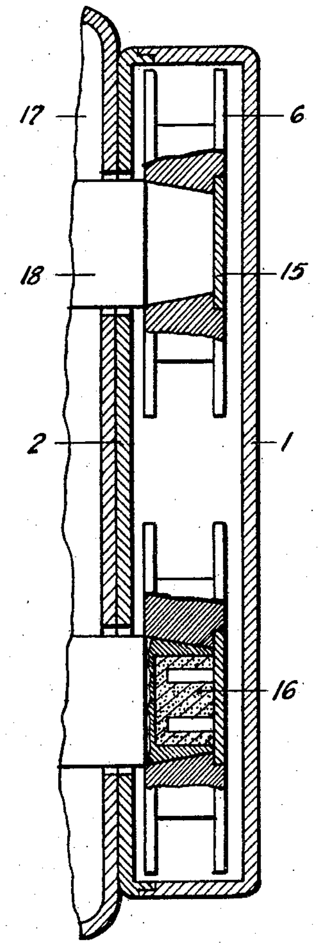
FIG. 6 is a simplified cross-section in elevation of the magazine mounted on the magnetic recorder, the section being made in the plane which passes through the two axes of the reels.

The magazine is centered by the centering member 13 and it is guided (FIG. 6) by the two conical reel-carriers 18 which form part of the recorder apparatus. The reel carriers 18 are each provided at their centres with a circular permanent magnet 16, whilst each of the reels 6 has a circular inset 15 of soft iron. This arrangement ensures the drive of the reel 6 by means of friction applied on the cone of the reel-carrier 18. In addition, it roughly positions the magazine with respect to the recorder.

The magazine having been placed in position as indicated above, the knob B is now rotated through 90° in one direction or in the other. The cam-spring 9 locks the magazine. The flat spring 11 again takes up its position shown in FIG. 1, so that the reels 6 are liberated. On a tape recorder, the head (indicated at 14 in FIG. 2) is always in the same position and its upper part comes into contact with the lug 7 (see FIGS. 4 and 9), lifts this lug (see FIGS. 2 and 8) in such manner that the release member 4 is no longer locked and moves from right to left under the action of the spring 12, to take up the position shown in FIG. 1, at which the tape cooperates with the head 14.

In the case of a recorder using wire, in which the head 14 may take up a range of vertical positions between the inner edges of the reels 6, the wire remains held by the saw-tooth arms 4B, whatever the vertical position of the head may be, the wire being held between the teeth and being able to move laterally but not able to fall. As long as the head is in an intermediate position in its range of vertical positions, the member 4 remains locked, even if the knob B is in the position shown in FIGS. 1 and 2. The recorder begins to function, and it is only when the head is in its highest position and acts on the lug 7 that the release member 4 is released and that the tension of the wire brings back the latter to its position on the head.

By virtue of this arrangement, the wire can never be placed above the head, which would inevitably result in breaking the magnetic wire.

It will be understood that the details, the materials, and the dimensions of the apparatus described may be varied without thereby departing from the scope of the invention.

What I claim is:

1. A composite magnetic recorder device comprising in combination a magnetic recorder having a magnetic head and driving shafts, and utilizing a reproducing medium, and a universal magazine comprising side walls and a bottom face for engaging said recorder, said bottom face having apertures for the passage of said magnetic head and driving shafts protruding from said recorder; a pair of recesses in said magazine; a pair of reels housed in said recesses and upon which is wound said reproducing medium and between which travels said medium in a plane perpendicular to said bottom face; a shaft passing through said magazine; a knob fast with said shaft; a first cam and a second cam fast with said shaft whereby rotation of said cams is controlled by said knob; means attached to said recorder and engageable by said first cam to lock said magazine on said recorder in a first position of said first cam and hence of said knob, said means being disengageable by said first cam to unlock said magazine in a second position of said knob; a plate member engaged by said second cam and slidable in a plane parallel to said bottom face under the action of said second cam in said second position of said knob, said plate member pushing said reproducing medium and locking the same against one of said side walls of said magazine while in the first position of said knob, said medium being released when said plate member returns to its original position; and resilient means urged by one of said cams when said knob is in the second position whereby said resilient means acts on said reels to lock the same in said recesses.

2. A composite magnetic recorder device comprising in combination a magnetic recorder having an upper face and a magnetic head capable of travelling in a plane perpendicular to said upper face and driving shafts, and utilizing a reproducing medium in the form of a wire, and a universal magazine comprising side walls and a bottom face for engaging said recorder, said bottom face having apertures for the passage of said magnetic head and driving shafts protruding from said recorder; a pair of recesses in said magazine; a pair of reels housed in said recesses and upon which is wound said reproducing medium and between which travels said medium in a plane perpendicular to said bottom face; a shaft passing through said magazine; a knob fast with said shaft; a first cam and a second cam fast with said shaft whereby rotation of said cams is controlled by said knob; means attached to said apparatus and engageable by said first cam to lock said magazine on said recorder in a first position of said first cam and hence of said knob, said means being disengageable by said first cam to unlock the same in a second position of said knob; a plate member engaged by said second cam and slidably in a plane parallel to said bottom face under the action of said second cam in said second position of said knob, said plate member pushing said reproducing medium and locking the same against one of said side walls of said magazine outside of said travel of said magnetic head; a resilient stop member engageable in said plate member to retain it when the same locks said reproducing medium, said stop member being in the path of said head at the outermost protruding position thereof and being operable by said head to release said plate member; and resilient means urged by one of said cams when said knob is in the second position whereby said resilient means acts on said reels to lock the same in said recesses.

3. A device as claimed in claim 2 wherein said plate member comprises arms perpendicular to said bottom face, i.e. parallel to said plane of travel of said medium, said arms being formed with outwardly-directed saw-teeth serving to hold said medium against said side walls of said magazine.

4. A magazine comprising a casing having side walls and a bottom face, a pair of recesses provided in said casing, a pair of reels housed in said recesses and upon which is wound a reproducing medium and between which travels said medium in a plane perpendicular to said bottom face, a shaft passing through said casing, a knob fast with said shaft, cam means fast with said shaft whereby rotation of said cam means is controlled by said knob, a plate member slidable in a plane perpendicular to the plane of travel of said medium, said plate member being engaged by said cam means and being capable to engage said medium, said plate member sliding under the action of said cam means from a first location corresponding to a first position of said knob in which said plate is not engaged with said medium to a second location corresponding to a second position of said knob in which said plate member pushes said medium and locks the same against one of said side walls, and resilient means urged by said cam means when said knob is in said second position whereby said resilient means acts on said reels to lock the same in said recesses.

References Cited in the file of this patent

UNITED STATES PATENTS

| | | |
|---|---|---|
| 2,437,997 | Charlin | Mar. 16, 1948 |
| 2,584,733 | Owens | Feb. 5, 1952 |
| 2,804,508 | Mastling et al. | Aug. 27, 1957 |